United States Patent [19]

Kretz

[11] 4,383,447
[45] May 17, 1983

[54] ULTRASONIC EQUIPMENT FOR EXAMINATIONS USING SECTION DISPLAYS

[75] Inventor: Carl Kretz, Zipf, Austria

[73] Assignee: Kretztechnik Gesellschaft m.b.H., Zipf, Austria

[21] Appl. No.: 224,188

[22] Filed: Jan. 12, 1981

[30] Foreign Application Priority Data

Jan. 23, 1980 [AT] Austria .................................. 340/80

[51] Int. Cl.³ ........................ G01N 9/24; G01N 29/00
[52] U.S. Cl. ...................................... 73/626; 73/620; 128/660
[58] Field of Search ..................... 73/620, 625, 626; 128/660, 661, 662

[56] References Cited

U.S. PATENT DOCUMENTS

| | | | |
|---|---|---|---|
| 3,815,409 | 6/1974 | Macouski | 73/625 X |
| 4,028,934 | 6/1977 | Sollish | 128/660 X |
| 4,102,204 | 7/1978 | Kretz . | |
| 4,135,406 | 1/1979 | Kretz | 73/620 |
| 4,143,554 | 3/1979 | Nagy et al. | 73/626 X |
| 4,176,658 | 12/1979 | Kossoff et al. | 128/660 |
| 4,177,679 | 12/1979 | Soldner | 73/625 |
| 4,281,549 | 8/1981 | Kretz | 73/626 |
| 4,287,767 | 9/1981 | Kretz | 73/625 |
| 4,316,390 | 2/1982 | Kretz | 73/620 |

FOREIGN PATENT DOCUMENTS

| | | | |
|---|---|---|---|
| 2039671 | 7/1980 | United Kingdom | 128/660 |
| 2040451 | 7/1980 | United Kingdom | 128/661 |
| 2040452 | 7/1980 | United Kingdom | 128/660 |

Primary Examiner—Anthony V. Ciarlante
Assistant Examiner—David V. Carlson
Attorney, Agent, or Firm—Kurt Kelman

[57] ABSTRACT

Focussing sound transducer head comprise at least one focussing sound transducer head for transmitting ultrasonic pulses to form a focussed sound beam having a relatively constricted depth zone, in which the sound beam is narrower than a sound beam that would be transmitted by a nonfocussing sound transducer head that is otherwise comparable to the sound transducer head which transmits said focussed sound beam, and for deriving echo signals from echoes generated in response to the pulses. A scanning mechanism moves the sound beam across a section surface in an object to be examined. Display controls are adapted to receive said echo signals and cause the echo signals to be displayed on a fluorescent screen at locations which are geometrically coordinated with the locations at which the corresponding echoes have originated in the section surface. Zone controls are operable to control the position of the relatively constricted length zone in such a manner that a plurality of relatively constricted length zones are successively obtained in different depth zones of the section surface. A signal selecting apparatus is operable to receive the echo signals and to deliver to the display control means only echo signals derived from echoes that have originated in the relatively constricted length zones.

10 Claims, 6 Drawing Figures

ULTRASONIC EQUIPMENT FOR EXAMINATIONS USING SECTION DISPLAYS

This invention relates to ultrasonic equipment for examinations using section displays, particularly for use in medical diagnosis, comprising a scanning mechanism which is adapted to be adjusted to a preselectable section surface of an object and operable to move a pulsed sound beam transmitted by at least one focussing sound transducer head across the section surface with the aid of mechanically moved parts, whereas echo signals derived from echoes generated in response to the transmitted sound pulses are displayed on a fluorescent screen at locations which are geometrically coordinated with the locations at which the corresponding echoes have originated, and wherein the resolution in a relatively constricted length zone of the sound beam is improved in that the focussing results in a constriction of the sound beam compared with the sound beam transmitted by a comparable nonfocussing sound transducer head.

It is known that the image quality of section displays of objects can be improved by the use of focussing sound transducer heads because focussing results in a more or less strong constriction of the sound beam that has been transmitted by the sound transducer head so that the sound beam is smaller in diameter than an unfocussed sound beam from the same sound transducer. This results in an improved lateral resolution. It does not make a difference whether the focussing is mechanically effected by means of a lens element or a curved sound transducer or is electronically effected by a so-called phased array resulting in a phase-displaced excitation of different transducer zones, which in most cases are annular. Focussing sound transducer heads have basically the disadvantage that the sound beam is constricted only in a certain depth range, which begins at a certain distance from the sound transducer, and extends only over a certain length and that outside that range the sound beam is more divergent than a normal sound beam and has less desirable properties there than a sound beam transmitted by a nonfocussing sound transducer head.

The shorter the focal length of the focussed sound beam, the shorter will be its constricted zone. With short focal lengths, the constricted zone will be near the sound transducer head. Whereas a longer constricted zone will be obtained if the focal length is large, the constricted zone will begin in that case only at a substantial distance from the sound transducer head and only a relatively slight constriction will be obtained so that the lateral resolution will not be decisively improved. So far it has not been possible to provide a system in which the lateral resolution is improved throughout the depth of a section display by focussing.

Various remedies have been proposed in order to eliminate the above-mentioned difficulties and basically reside in the use of bifocal or multifocal sound transducers or bifocal or multifocal lenses arranged in front of the sound transducers. In a known design, a monofocal sound transducer is divided into annular zones, which can be excited individually or jointly so that the region of highest sensitivity and, as a result, the zone in which the sound beam is most highly constricted, can be shifted to different portions of the sound beam. With that design the lateral resolution can be improved in a certain depth range of a section surface but the focussing will result in a poorer lateral resolution in the remaining depth ranges of the section surface. The described effect which permits a shifting of the zone having the highest sensitivity can be increased by the use of a bifocal sound lens.

Another design which has been proposed comprises a bifocal sound transducer which produces two sound beams at the same time. That proposal is based on the erroneous belief that the diameter of the composite sound beam, which generates a multiple-curvature wavefront will correspond at any point to the diameter of the individual focussed sound beam which is smaller in diameter at that point. That erroneous conclusion has led to the belief that a constricted zone will be formed which is equal in length to the sum of the lengths of the constricted zones of the two individual sound beams. In fact, however, the diameter of the resulting sound field is equal at any point to the diameter of the sound beam which is larger at that point. In no case can such focussing result in improved properties in a zone which begins at the sound transducer head. If a focussed sound beam is to be used to examine an object near its surface, the sound beam must traverse a pre-entry zone between the sound transducer and the surface of the object.

It is an object of the invention to provide ultrasonic equipment which is of the kind stated and which permits an examination with generation of section displays and with a higher lateral resolution throughout the depth of the section surface.

This object is basically accomplished in that the relatively constricted length zone of the sound beam transmitted by the or each sound transducer head is smaller than the depth of the section surface to be represented by a section display and that the section surface is adapted to be scanned throughout its depth with one or more sound beams having during successive scans relatively constricted length zones disposed in different depth zones of the section surface as a result of an adjustment of different focal lengths of the sound beam or beams or of a pre-entry distance traversed by the sound beam or beams before entering the object, and that selecting means are provided for selecting only echo signals derived from echoes that have originated in said relatively constricted length zones and for causing only said selected echo signals to be displayed on said fluorescent screen.

In equipment in accordance with the invention, the section surface which is scanned for the generation of the display is divided into two or more depth zones, one or which is scanned at a time with increased lateral resolution by a constricted region of the sound beam. The signals received at a time at a higher sensitivity are then combined on the fluorescent screen to form the overall section display.

To facilitate the understanding of the invention, the pertinent quantitative relations applicable to focussing sound transducer heads must be discussed because sufficient technical literature on this subject matter is not yet available. Some terms must be exactly defined because their definitions are not clear or even mutually inconsistent in the literature which is available. These clarifications will be furnished in the first part of the subsequent detailed description of the drawings. This will be followed by the detailed description of illustrative embodiments and of further disadvantage and details of the subject matter of the invention.

The subject matter is illustrated by way of example on the accompanying drawings, in which.

Figure 1:
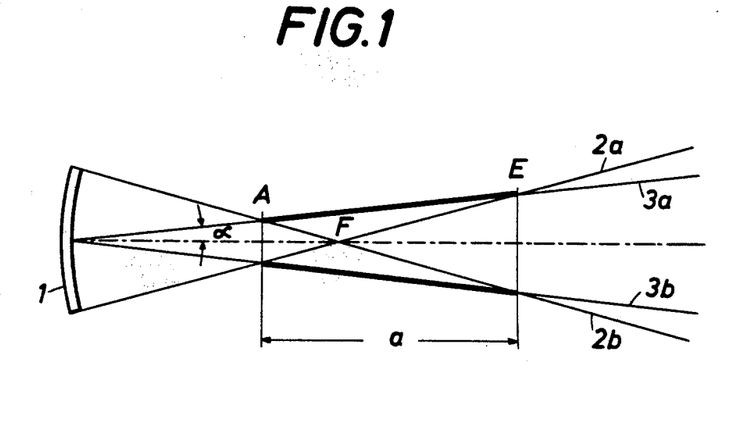
FIG. 1 shows a simple approximate design which serves to explain the physical relationships and permits a definition of the sound field of a focussing sound transducer head with adequate accuracy.

FIG. 1 shows a curved sound transducer 1, which is representative of a focussing sound transducer head. The focal length of that sound transducer head equals the radius of curvature of the sound transducer 1 so that the focal point F lies at the center of curvature. If the curved sound transducer is replaced by a flat sound transducer and a sound lens disposed in front of the transducer, the focal length and the location of the focal point can be calculated with the aid of formulae which are known from optics. That location is not identical to the location of the focal point F as defined hereinbefore in accordance with physical laws. The sound field generated by the focussing sound transducer head 1 can be determined by a quite adequate approximate design, in which straight lines 2a, 2b are drawn from the edges of the sound transducer 1 through the focal point F and straight lines 3a, 3b which diverge like the sound beam transmitted by a corresponding nonfocussing sound transducer head in the far field are drawn from the center of the sound transducer 1. That divergence $\alpha$ of the unfocussed sound beam in the far field can be calculated by the formula $$\sin = 1.22 \times (\lambda/D)$$

where D is the diameter of the sound transducer and $\lambda$ is the wavelength.

The envelope of the sound beam transmitted by the focussing sound transducer head is defined by the straight lines 2a, 2b, 3a, 3b, specifically by the convergent straight lines 2a, 2b near the sound transducer, then by the divergent straight lines 3a, 3b and finally by the divergent straight lines 2a, 2b. The zone a in which improved properties are obtained is defined by the cross-sections A and E where the straight lines 2a, 3a and 2b, 3b, respectively, intersect. The zone a between the cross-sections A and E is described as the relatively constricted length zone of the focussed sound beam transmitted by the focussing sound transducer head. In view of the geometric relationships illustrated in FIG. 1, the distances $1_A$ and $1_E$ from the sound transducer 1 to the cross-sections A and E can be expressed by the following approximate formulae $$1_A = \frac{f \times D^2}{D^2 + 2.44 \times \lambda \times f}$$

and $$1_E = \frac{f \times D^2}{D^2 - 2.44 \times \lambda \times f}$$

wherein f is the focal length and D and $\lambda$ have the meanings stated above.

It is apparent from these formulae that there can be no finite distance $1_E$ from the sound transducer to the far end E of the relatively constricted length zone of the sound beam if the distance $1_A$ from the sound transducer to the near end A of the relatively constricted length zone of the sound beam is zero. Whereas $1_A$ might theoretically be zero, this would mean that f=0 or D=0, which would make no sense from a physical aspect, and E would be zero too in that case.

Figure 2:
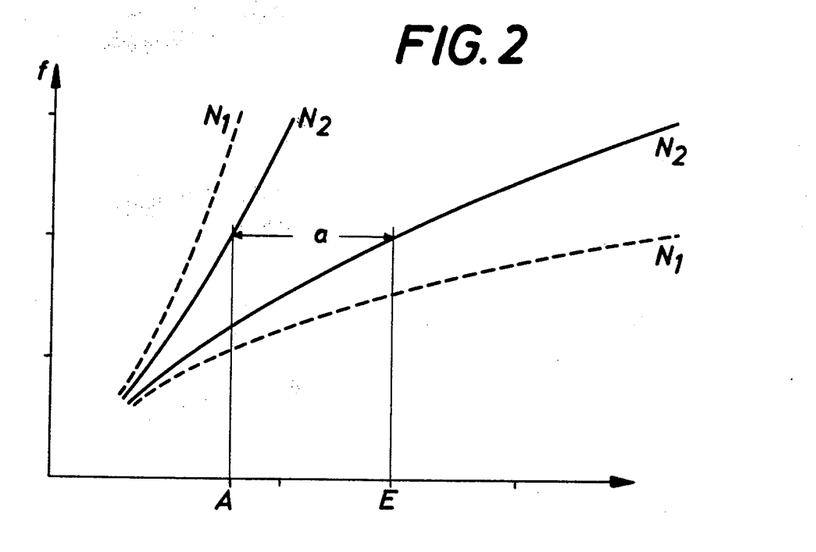
FIG. 2 is a graph which shows for two different sound transducers the relatively constricted length zones of sound beams having different focal lengths and near-field lengths, the distance from the sound transducer being plotted along the axis of abscissae and the focal length being plotted along the axis of ordinates.

The relationships which have been described are illustrated also in the graph of FIG. 2, where the curves N1, N2 represent the near-field lengths of the beam transmitted by sound transducer heads as significant parameters and is it shown how the length of the relatively constricted length zone which can be utilized at a time and the distance of said zone from the sound transducer varies with the focal length. The relationship between the parameters defined hereinbefore and the near-field length N can be mathematically expressed as follows:

$$N = 0.25 \times (D^2/\lambda)$$

The shorter the distance $1_A$ from the sound transducer to the near end A, the shorter will be in both cases the length a of the relatively constricted length zone.

From the relationships described it is apparent that it is not possible to design a focussing sound transducer head which can transmit a sound beam having a relatively constricted length zone from its origin ($1_A=0$) to the desired maximum depth of the section surface to be scanned, e.g. $1_E=300$ mm. When a sound transducer head is designed to transmit a sound beam having a relatively constricted length zone in a desired length of, e.g., 300 mm, and a pre-entry zone is provided so that the near end of the relatively constricted length zone is near the surface of the object, the focal lengths must be very large so that the sound beam can be constricted only to a relatively slight degree.

As has been mentioned, the basic concept of the invention is to use sound transducer heads for transmitting sound beams having relatively constricted length zones which are shorter than the depth of the section surface to be scanned and to scan said section surface with sound beams having relatively constricted length zones adjusted to different depth zones of the section surface. An adjustment to different depth zones can basically be effected where only one sound transducer head and different pre-entry distances are employed or where a plurality of sound transducer heads having different pre-entry distances associated with them are employed. The use of relatively constricted length zones which are relatively short affords the additional advantage that the sound beams will be more highly constricted in said zones and that the advantages afforded by the focussing become effective and, besides, the pre-entry distances may be relatively short so that a more compact equipment can be provided.

Figure 3:
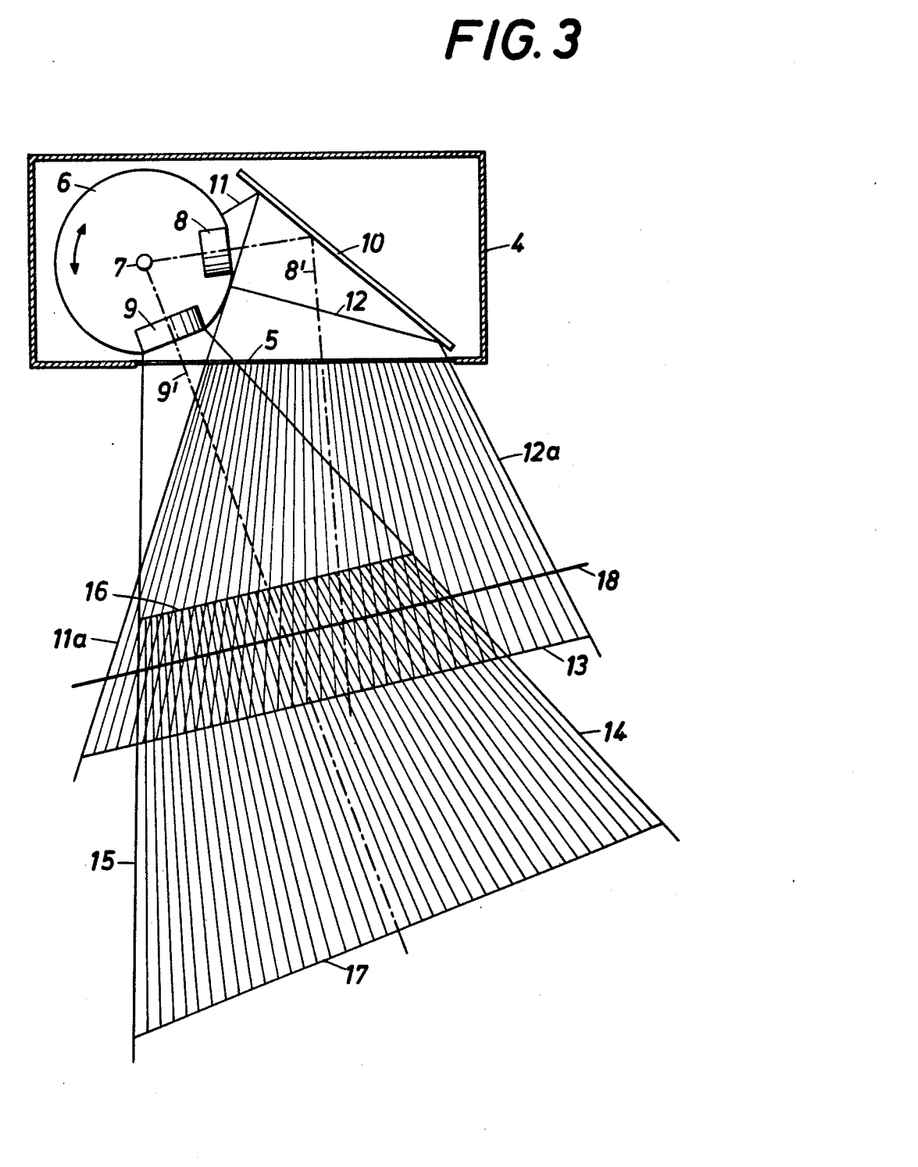
FIG. 3 is a diagrammatic sectional view showing the scanning mechanism of the equipment according to the invention with indications of the scanned regions of the section surface.
Figure 4:
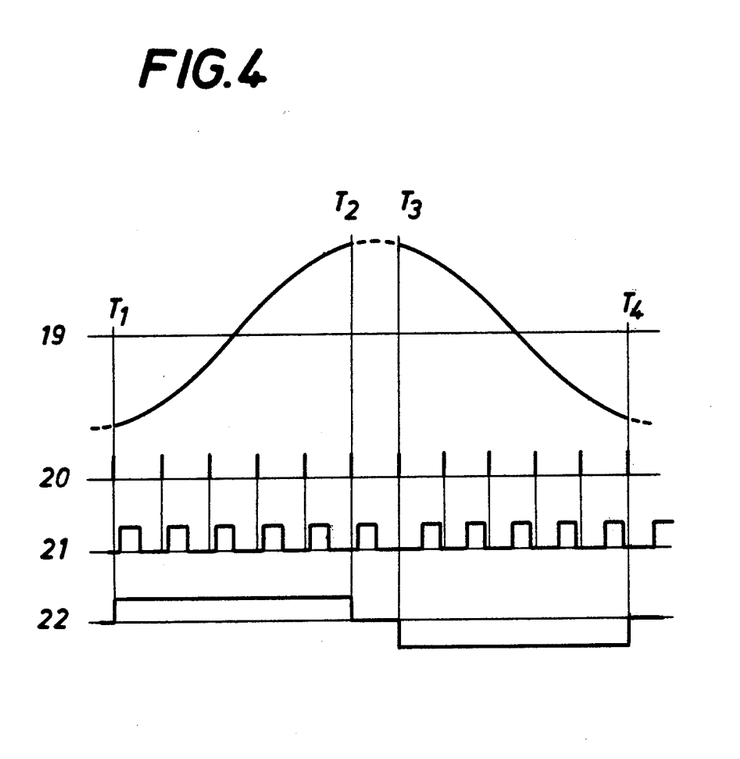
FIG. 4 is a time-base graph explaining the mode of operation of the equipment shown in FIG. 3.
Figure 5:
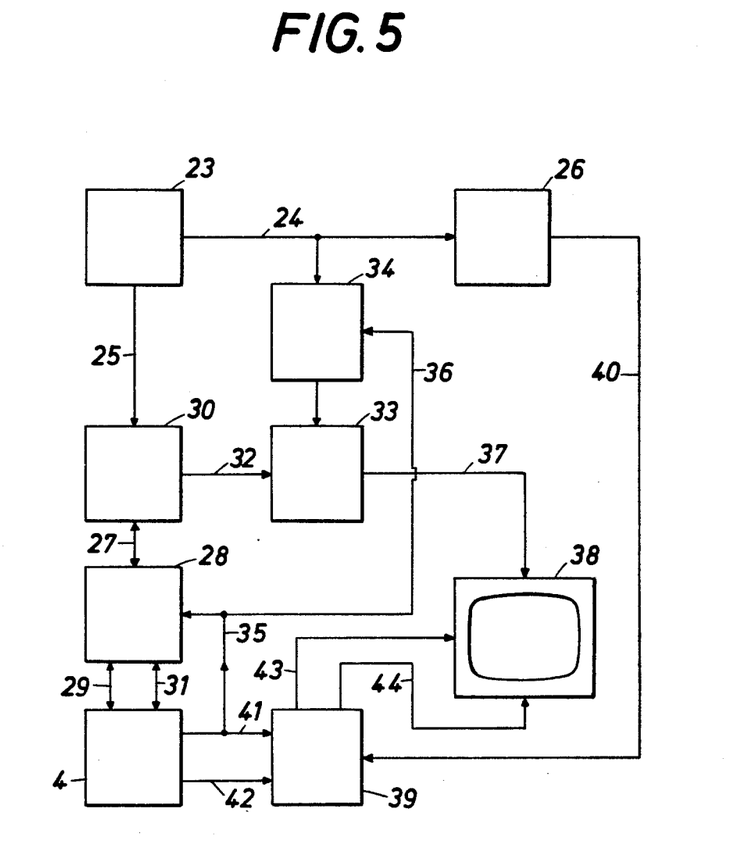
FIG. 5 is a block circuit diagram of the entire equipment.

In the equipment shown in FIGS. 3 to 5, a housing 4 accommodates a scanning mechanism. The housing 4 is filled with a sound-conducting liquid and is provided on its underside with a sound-permeable window 5, which may consist of a diaphragm. If that diaphragm is formed by an elastic plastic material sheeting, it will be able to adapt itself to the surface of the object to be examined.

The housing 4 contains a carrier 6 for a sound transducer head. Drive means, not shown, are provided to impart an oscillating pivotal movement to said carrier 6 about an axis 7. The carrier 6 carries two focussing sound transducer heads 8 and 9.

The sound transducer head 8 is directed toward a reflector, which is disposed within the housing 4 and consists of a mirror 10. The sound beam which is transmitted by the sound transducer head 8 is reflected by the mirror and then enters through the window 5 the object to be examined. The axis 8' of that sound beam in the instantaneous position shown is indicated by a dotted line. The limits of the pivotal movement of the axis 8' of the sound beam are indicated by lines 11, 12, which in accordance with the reflection laws change their directions at the mirror 10 and are then continued by the lines 11a, 12a, which define that region of the section surface which is scanned by the sound transducer head 8. The focussing effected by the sound transducer head 8 is selected so that the sound beam transmitted by said sound transducer head has a relatively constricted length zone which has a near end approximately at the window 5. That sound beam traverses a pre-entry distance within scanning mechanism housing 4 from the sound transducer head to the window 5 and then enters the object to be examined. The far end of the relatively constricted length zone of the sound beam transmitted by the sound transducer head 8 is indicated by a line 13.

The second focussing sound head 9 transmits a sound beam virtually direct to the window 5 and then into the object to be examined and the axis 9' of said sound beam is oscillated between limits 14, 15. The sound beam transmitted by the sound transducer head 9 has a relatively constricted length zone having a near end indicated by a line 16 and a far end indicated by a line 17. Selecting means, to be described more in detail hereinafter, are provided to select for the display only signals derived from echoes which have originated in the relatively constricted length zones between lines 5 and 13 and between lines 16 and 17, respectively. The two relatively constricted length zones overlap between lines 13 and 16. In that overlap zone, there is a boundary 18, which is preferably adjustable between the lines 13 and 16 by suitable adjusting means. The display of parts of the section surface disposed above the boundary 18 is controlled by the sound transducer head 8. The display of parts of the section surface disposed under the boundary 18 is controlled by the sound transducer head 9. The adjustment of the boundary 18 permits a display of small structures in the overlap zone between lines 13 and 16 under the control of a single sound transducer head.

The sound transducer heads 8 and 9 are operated in alternation so that they will not interfere with each other. A rapid alternation will be possible if control pulses for controlling the transmission of sound beams are applied to the two sound transducer heads in alternation. Alternatively, sound can be transmitted and echoes can be received by the sound transducer heads 8, 9 during their forward and return movements and in that case only one sound transducer head may be operated during the movement in one sense and the other sound transducer head during the movement in the other sense. In case of a rapid alternation in conjunction with an activation of the sound transducer heads during their forward and reverse movements, the inevitable hysteresis of the oscillating motion and possibly a vibration of the mechanism superimposed on that movement may result in a blur. If the activation of the sound transducer heads is changed only at the points of reversal, blurs can occur only at the display of the boundary 18 between the two parts of the section surface.

The schedule for the last-mentioned mode of operation is shown in FIG. 4.

The graph 19 represents the motion of the carrier 6 for the sound transducer heads. This motion is preferably a harmonic oscillation because this will involve the smallest accelerating and decelerating forces. Graph 20 represents a time scale for the repetition of the pulses controlling the transmission of sound. For the sake of clearness, graph 20 shows only every one-hundredth control pulse generated during the motion represented in graph 19. For further simplification, the control pulses 20 are shown in equal intervals of time although it may be more favorable to control the generation of the control pulses in dependence on the motion of the carrier for the sound transducer heads, e.g., in dependence on the extent of the movement, so that the section surface can be scanned with a uniform lateral resolution even during a non-uniform motion of the carrier for the sound transducer heads.

Graph 21 represents the times in which a gate is open which only when open will transmit signals that have been generated by the sound transducer heads in response to echoes received and have been amplified by an amplifier. In this way, the gate will virtually prevent a delivery to the display means of signals derived from echoes which have originated outside a relatively constricted length zone of a sound beam. The gate is opened in the interval between times T1 and T2 with a certain time delay after the generation of each control pulse. A different time delay may be used in the interval between times T3 and T4. The gate may be open for different times in the interval T1 to T2 and in the interval T3 and T4 and by an adjustment of the boundary 18 (see FIG. 3) may be varied between limits defined by the lines 13 and 16. The graph 22 represents the state of a change-over switch, which in one closed state, indicated above the reference line, connects one of the sound transducer heads 8 and 9 to the display means, and in its other closed state, indicated below the reference line and assumed between times T3 and T4, connects the other sound transducer head to the display means.

FIG. 5 is a block circuit diagram showing the essential parts of ultrasonic equipment which is provided with a device as represented in FIGS. 3 and 4. In the simplest form, the equipment comprises a clock 23, which via leads 24, 25 triggers a sweep generator 26 for the time base, and a control pulse generator 30, which is contained in a block that contains also the receiver and the entire electronics required to process the signals. Those electronics comprise means for depth compensation, for setting a threshold value, for demodulation, and for filtering. The signals generated by the control pulse generator 30 are applied via a lead 27 to an electronic change-over switch 28 and in accordance with the schedule 22 of FIG. 4 are applied by said switch via the leads 29, 31 in alternation to the two sound transducer heads 8 and 9 moved by the scanning mechanism 4. When one of the sound transducer heads 8 or 9 is activated and connected to the control pulse generator 30 by the switch 28, the echo pulses received by said sound transducer head will be converted into echo signals, which will be processed in the block 30, and the processed signals will be applied via a lead 32 to a gate 33, which is controlled by the clock 23 via an adjustable delay line 34 so that the gate is open during the times indicated by the graph 21. The time delay is also controlled by the scanning mechanism 4 to the sense for instance, in that sensors generate signals which represent, e.g., the sense of movement of the carrier 6 and are applied via leads 35, 36 to the delay line 34 so that different time delays are obtained during the forward and reverse movements of the carrier 6. Means for adjusting the limit 18 may also be provided.

The echo signals transmitted by the gate 33 are delivered to a lead 37 and used to unblank the electron beam applied to a fluorescent screen 38.

The horizontal and vertical deflection of the electron beam is controlled by a display computer 39, which from the sweep generator 26 via lead 40 receives sweep signals and from the scanning mechanism 4 via leads 41, 42 receives signals representing the instantaneous position of the activated sound transducer head 8 or 9 relative to the section surface. Signals in lead 41, which represent the direction of movement, may be used to synchronize the picture. In response to the signals, the display computer 39 generates deflecting voltages, which via leads 43, 44 are applied to the display device. In the simplest case, only individual pulses are applied to the lead 42 and are generated whenever the sound beam has performed a certain increment of scanning movement. These signals are then counted and processed in the display control computer 39. At least theoretically, disturbing pulses may result in false counts so that the display control computer may drift from the actual position of the carrier 6 for the sound transducer heads. In that case, the synchronizing pulses applied via lead 41 are used to set the counters in the display control computer to a preselected count so that the counters will be synchronized after each half-cycle of the motion of the carrier for the sound transducer heads.

The equipment described thus far can be modified and extended in various ways within the basic concept of the invention. In the arrangement shown in FIG. 3, a single sound transducer head might be used, which is pivotally movable between lines 11 and 15 so that its sound beam will be transmitted direct into the object to be examined during one part of the movement of the head and will traverse a pre-entry distance during another part of said movement.

Figure 6:
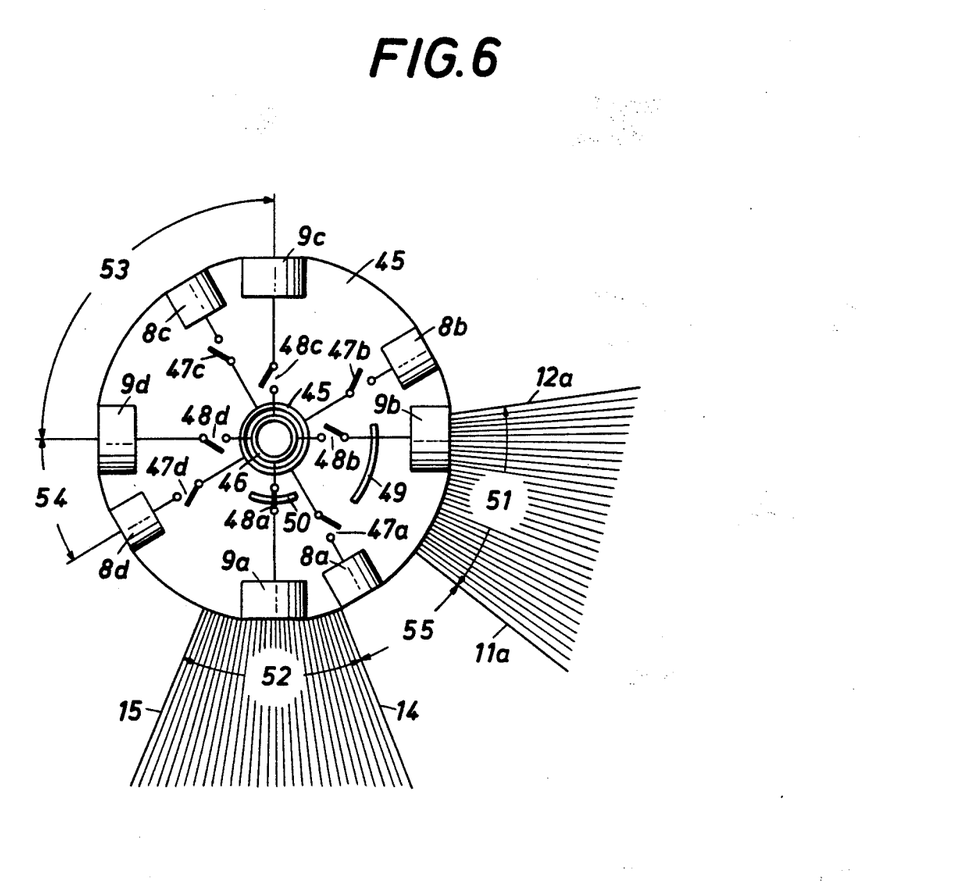
FIG. 6 is a simplified diagrammatic elevation showing the main part of a scanning mechanism which comprises a wheel.

In accordance with FIG. 6, the oscillating carrier 6 for the sound transducer heads, shown in FIG. 3, has been replaced by a wheel 45, which can be uniformly rotated. The wheel carries two groups of sound transducer heads 8a to 8d and 9a to 9d, respectively. The sound beams transmitted by the sound transducer heads 8a to 8d traverse a pre-entry distance before entering the object to be examined and the sound transducer heads 9a to 9d transmit sound beams direct into an object to be examined. The sound transducer heads of each group 8a to 8d or 9a to 9d are interconnected by a ring lead 45 or 46. These ring leads rotate with the wheel and are connected to the stationary leads from the control equipment by means which are not shown and which may consist of rotating transformers or of slip rings. In the latter case, these slip rings themselves may constitute the ring leads.

The connecting leads incorporate switches 47a to 47d and 48a to 48d, which may consist of magnetically operable switches, which are operated by magnets 49 and 50, respectively, which are carried by the wheel and rotate with it and are spaced different distances from its axis of rotation. Each of the magnets 49 and 50 causes an associated one of the switches 47, 48 to be closed as long as it moves past the magnet as the wheel rotates through an angle 51 or 52. The sound transducer head connected to each switch will be activated as long as the switch is closed. The sound transducer heads 8a to 8d and 9a to 9d must be so arranged on the wheel 45 that only one sound transducer head is activated at a time. The angular spacing 53 of two sound transducer heads of the same group 8a to 8d or 9a to 9d must be at least as large as the sum of the angles 51, 52 of the ranges in which the sound transducer heads of each group are activated. The angular spacing 54 of two adjacent sound transducer heads of different groups must be as large as or smaller than the angle 55 between the edges 14, 11a of the adjacent scanning ranges. The use of a wheel 45 affords the advantage that the uniform motion can hardly give rise to mass forces which result in vibration and that a uniform lateral resolution will be obtained even when the pulse repetition frequency is constant. On the other hand, a larger number of sound transducer heads are required and the sound transducer heads of a group must be carefully matched in all properties, also as regards focussing. The angular spacing 53 and preferably the angles 51, 52 are so selected that they have an integral multiple amounting to 360° so that the display will not be interrupted between the continually generated fields. A simplified arrangement has been shown in FIG. 6. The magnetically operated switches may be replaced by light-responsive switches or by switches which are closed in accordance with a program.

It has been mentioned hereinbefore that the sound transducer heads 8, 9 or 8a to 8d and 9a to 9d are focussing sound transducer heads. These sound transducer heads may be operated at different ultrasonic frequencies. In the sound beam having a relatively constricted length zone in the near part of the section surface, the sound waves travel through the pre-entry zone and that zone can be so designed that the sound waves will be only slightly attenuated before entering the section surface. In the other sound beam, the sound waves travel through highly absorbent tissue before entering the relatively constricted length zone of that beam. That sound beam, which has a relatively constricted length zone near the surface of the object, may have a higher ultrasonic frequency than the sound beam transmitted by the other sound transducer head and for this reason may be smaller in diameter so that the depth resolution will be improved in that part of the section surface. Just as in the modification described in connection with FIG. 3, the embodiment of FIG. 6 may be provided only with one group of sound transducer heads, which can be activated while passing through both angular ranges 51 and 52.

The section surface to be displayed may be divided into three or more rather than only two depth zones if sound transducer heads for transmitting sound beams traveling over different pre-entry distances are employed in a corresponding number. In the embodiment shown in FIG. 3, the second pre-entry zone might be provided on that side of the carrier 6 which is remote from the reflector 10 and the window 5 is correspondingly enlarged.

In the embodiment described with reference to FIG. 5, the clock 23 determines a constant pulse repetition frequency. Particularly if the sound transducer heads perform a nonuniform motion, the sound pulse repetition frequency of the sound transducer head which is activated at a time may be controlled by a trigger pulse generator for generating trigger pulses, which trigger respective sound pulses. Such trigger pulse generator may be arranged to be activated by position or direction sensors, which are responsive to the relative position or sense of movement of the scanning mechanism and preferably cause each sound pulse to be triggered whenever the sound beam has traversed a given angular increment in a given depth zone, and by signals which represent the relatively constricted length zone that has been selected. As a result, the section surface will be scanned in accordance with a preselected program. The trigger pulse generator may include a preprogrammed part, which can be adjusted to different pulse repetition rates by the signals from the position or direction sensors and the signals representing the relatively constricted depth zone which has been selected. The overall display can be improved, particularly to prevent flickering, in that in known manner the display control signals are stored in a buffer memory and are read out of said memory for display on the fluorescent screen. In such an arrangement, writing into the memory in response to the occurrence of the signals may be effected in accordance with a program which differs from the reading program so that, e.g., the memory can be read in accordance with television standards and can be read more often than the section surface is entirely scanned. In this way, flickering can be prevented in section images which take a relatively long time for their generation. Nevertheless, a plurality of complete section images per second can be displayed for medical examinations so that moving section images may be displayed.

Where a buffer memory is used and the pulse repetition rate of the control pulses is program-controlled, steps can be taken to substantially eliminate corners in the outside contour of the entire section image which is displayed, i.e. the corners between lines 11a and 15 and between the lines 12 and 14 in FIG. 3.

What is claimed is:

1. Ultrasonic equipment for examining an object by scanning a region of a preselectable section surface of the object near a surface of the object and comprising a scanning mechanism including a housing and two focussing sound transducer heads adapted to be adjusted to the preselected section surface of the object and mechanically operable to move a sound beam across the section surface, focussing of the sound beam transmitted by the transducer head improving the lateral resolution by constricting the sound beam in the preselected region compared with a sound beam transmitted by a comparable unfocussed sound transducer head, the length of the region being smaller than the depth of the scanned section surface in the object and said sound beams having respective relatively constricted length zones disposed in different depth zones of said object, and zone control means operable to activate only one of said sound transducer heads at a time, the equipment further comprising scanning depth control means for adjusting the region to different depths and successively scanning the section surface at said depths, a fluorescent screen arranged to receive and display signals derived from echoes generated in response to the transmitted sound beams at locations of the screen geometrically coordinated with the locations in the object where the echoes originated, selecting means for selecting only those echo signals for display on the screen which originated in the selected region, and means defining respective pre-entry zones for the sound beams transmitted by the transducer heads, the sound beams being transmitted through the pre-entry zones in the scanning meachanism housing before they enter the object, the pre-entry zone associated with one of the sound transducer heads having a predetermined length in the housing while the sound beam transmitted by the other transducer head passes through a pre-entry zone of shorter length.

2. The equipment of claim 1, a common drive means for moving the sound transducer heads and a sound beam reflector means defining the length of the pre-entry zone traversed by the sound beam transmitted by the one transducer head.

3. The equipment of claim 1, the depth control means being adapted to control the position of the preselected regions so that successive ones of the regions overlap in depth, adjusting means for defining a boundary wherein the regions overlap, and said selecting means being adapted to suppress signals derived from echoes originating in said regions beyond the boundary.

4. The equipment of claim 1, wherein the scanning mechanism is adapted to perform an oscillating movement, means for selecting said region in one depth zone of the object during the movement in one sense and for selecting said region in another depth zone during the movement of the scanning mechanism in the opposite sense.

5. The equipment of claim 1, the scanning mechanism comprising a wheel carrying the sound transducer heads and drive means rotating the wheel at a uniform angular velocity.

6. The equipment of claim 1, a sensor adapted to generate an output signal in dependence on the movement of the scanning mechanism for alternately activating the sound transducer heads.

7. The equipment of claim 6, control means connected to the sensor for controlling the location at which the echo signals are displayed on the fluorescent screen.

8. The equipment of claim 6, a trigger pulse generator for controlling the sound pulse repetition rate of the activated sound transducer head, the trigger pulse generator being operable in response to the output signal of the sensor to generate trigger pulses for triggering the generation of respective sound pulses and being adapted to be activated by signals representing the selected region of the sound beam transmitted by the activated transducer head.

9. The equipment of claim 8, the trigger pulse generator being operatable to generate a respective one of the trigger pulses whenever one of the preselected regions has performed a predetermined increment of movement.

10. The equipment of claim 9, the trigger pulse generator comprising a pre-programmed part adjustable by the output signals of the sensor and the signals representing the selected region of the sound beam transmitted by the activated transducer head, and the pre-programmed part being adapted to control the pulse repetition rate of the sound beams in response to the output signal and said signals representing the selected sound beam region.

* * * * *